Patented July 26, 1932

1,869,172

UNITED STATES PATENT OFFICE

BRUCE F. SCHWALM, OF PITTSBURGH, PENNSYLVANIA, ASSIGNOR, BY MESNE ASSIGNMENTS, TO THE NEVILLE COMPANY, A CORPORATION OF PENNSYLVANIA

COMPOUNDING RUBBER

No Drawing.   Application filed July 24, 1930.   Serial No. 470,541.

This invention relates to a method of compounding rubber.

In the distillation of crude coal tar the lighter oils may be considered as those which distill over up to a temperature of 200 degrees centigrade. This light oil may be subjected to fractional distillation in order to obtain benzol, toluol, xylol, and solvent naphtha. These crude substances obtained by fractional distillation are then usually purified by a process which consists in mixing them with sulphuric acid, neutralizing and distilling. Still residues remain from this purification process. These still residues have heretofore been considered waste products.

I have discovered that these still residues resulting from the purification of the light oils as a whole, or of the several cuts of these oils separately, may be used to great advantage in the compounding of rubber stock.

According to the manner of conducting a distilling operation, there is a relatively wide variation in the density and consistency of these still residues. If the residues are in themselves of such viscosity that they will flow readily, the residue without further addition may be utilized for my purpose. If, however, the residue is of a heavy syrupy nature I prefer to mix it with one of the heavier coal tar oils, such as crude creosote oil or one of the oily fractions thereof. I have found suitable for my purpose either a still residue, or mixture of still residue and coal tar distillate, having a viscosity of between 39.8 and 314 by the Saybolt universal viscosimeter at the standard temperature of 100° Fahrenheit. The still residue and the coal tar oil are mixed in varied proportions to provide a mixture within this viscosity range, or such relatively slight variation therefrom, as may be suitable for compounding with rubber and filling material of particular grades and nature to produce a rubber compound having the desired characteristics.

In compounding the rubber, I add the still residue, or mixture of still residue and coal tar oil, to the rubber and the filling material therefor, such as carbon black, zinc oxide or fuller's earth. The compounding material may be added in a quantity by weight equal to or greater than one per cent., of the weight of the rubber. I have found that in compounding rubber for most purposes two per cent. of the added material gives highly satisfactory results.

The coal tar material is added to the rubber stock and filler and mixed therewith. The rubber stock, filling material, coal tar compounding material, and such other ingredients as may be desired, are then milled in the usual manner with rollers or a suitable masticator or mixer.

I have found that the use of the coal tar compounding material expedites the dispersion of the filling material, such as carbon black, through the body of the rubber stock, and renders such dispersion more uniform throughout the body of the stock. The rubber compound containing the special material is also softened by its use, and provides a superior rubber compound suitable for use for many purposes where softness and elasticity, as well as toughness are desirable. I have also found that my special compounding and softening material acts as an oxidation retarder, thereby prolonging the useful life of a rubber compound.

The effect of the residue from acid purification in retarding oxidation when compounded in rubber stock, is a distinguishing feature of this material. When present, either alone or mixed with coal tar distillate, the effect of the material in retarding oxidation is marked, and presents an advantage not obtained by the use of previously used organic accelerators or softeners, such as aniline oil, or a residue from straight distillation in a coal tar still. Its use also permits an increased quantity of filling material to be compounded with the rubber stock without producing an unduly stiff rubber compound, because of the complete and uniform dispersion of the filling material therethrough.

I claim as my invention:

1. In the process of compounding rubber the herein described step of expediting and improving the dispersion of filling material through rubber stock by mixing the rubber stock and filling material with a softening mixture comprising a still residue resulting from the acid purification of the lighter coal tar oils and an oily coal tar distillate.

2. In the process of compounding rubber the herein described step of expediting and improving the dispersion of filling material through rubber stock by mixing the rubber stock and filling material with a softening mixture comprising a still residue resulting from the acid purification of the lighter coal tar oils and an oily coal tar distillate, the mixture being added in an amount by weight equal to approximately two per cent. of the weight of the rubber.

3. A rubber compound comprising rubber and filling material having incorporated therein a softening mixture comprising a still residue from the acid purification of the lighter coal tar oils and an oily coal tar distillate.

4. A rubber compound comprising rubber and filling material having incorporated therein a softening mixture comprising a still residue from the acid purification of the lighter coal tar oils and an oily coal tar distillate, the softening mixture being present in an amount by weight equal to approximately two per cent. of the weight of the rubber.

In testimony whereof I have hereunto set my hand.

BRUCE F. SCHWALM.

DISCLAIMER 1,869,172.—*Bruce F. Schwalm*, Pittsburgh, Pa. COMPOUNDING RUBBER. Patent dated July 26, 1932. Disclaimer filed July 24, 1936, by the assignee, *The Barrett Company*.

Hereby disclaims from claims 1 and 2 any and all processes, and from claims 3 and 4 any and all compounds except those in which the still residue referred to in all of said claims is a crude residue, i. e., is a still residue resulting from the acid purification of the lighter coal tar oils which residue has not been subjected to a refining treatment.

[*Official Gazette August 18, 1936.*]